United States Patent [19]

Allen

[11] 3,715,493

[45] Feb. 6, 1973

[54] SERVICE SWITCH ARRANGEMENT FOR IMPROVED INTERLACE PERFORMANCE

[75] Inventor: John Kenneth Allen, Indianapolis, Ind.

[73] Assignee: RCA Corporation

[22] Filed: Oct. 12, 1971

[21] Appl. No.: 187,987

[52] U.S. Cl. .........178/7.3 R, 178/5.4 R, 178/5.4 TE

[51] Int. Cl. ............................H04n 5/44, H04n 9/12

[58] Field of Search..178/7.3 R, 7.5 R, 5.4 R, 5.4 TE

[56] References Cited

UNITED STATES PATENTS 3,598,905 8/1971 Keprta, Jr.......................178/5.4 TE

*Primary Examiner*—Richard Murray
*Attorney*—Eugene M. Whitcare

[57] ABSTRACT

A set-up switch, employed in making gray scale adjustments during the manufacture and servicing of a television receiver, is constructed to disable the receiver's vertical deflection by opening the cathode circuit of the vertical output tube. By connecting into a relatively low impedance cathode circuit, any tendency for the switch network to pick up and couple horizontal pulse voltages into the vertical circuitry will be minimized, and interlace performance will be optimized. This will be so though the leads from the vertical output tube to the service switch on the television chassis are of the order of 24 inches, and longer.

4 Claims, 1 Drawing Figure

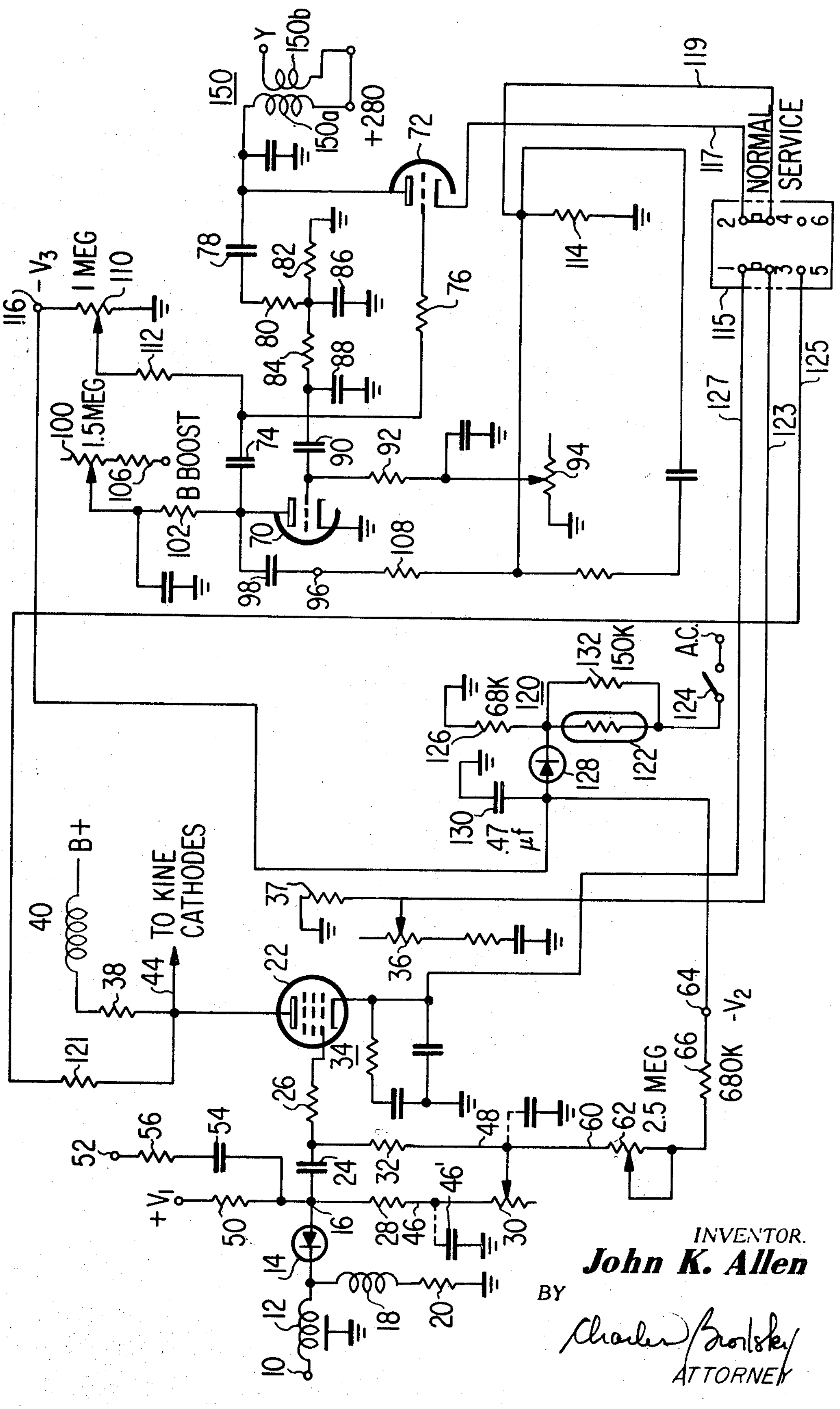
INVENTOR.
John K. Allen
BY
ATTORNEY

SERVICE SWITCH ARRANGEMENT FOR IMPROVED INTERLACE PERFORMANCE

FIELD OF THE INVENTION

This invention relates to improvements in interlace operation of a television receiver and, more particularly, to a service switch construction which stabilizes such operation in a receiver having an image control circuit of the type disclosed in the pending U.S. Pat. Application, Ser. No. 158,451, filed June 30, 1971, and assigned to the same assignee as is the invention of the instant disclosure.

SUMMARY OF THE INVENTION

As described in the Ser. No. 158,451 application, a voltage dependent resistance is employed to stabilize the brightness and vertical height of a reproduced image in the presence of line voltage variations. The resistance is serially coupled with a fixed resistor between a point of power line voltage and ground while a semiconductor rectifier and filter capacitor are serially coupled across the fixed resistor, in turn, to provide at their junction a direct voltage which varies in accordance with line voltage changes. The direct voltage provided by rectification and filtering is supplied to a brightness limiter potentiometer, on the one hand, to control the grid bias on a video output tube, and to a vertical height potentiometer, on the other hand, to control the grid bias on a vertical output tube. Substantially constant picture brightness and vertical height results for a range of power line voltages with that construction.

A preferred embodiment of the present invention provides a modification of the vertical output stage there illustrated in its opening of the cathode circuit of the vertical output tube when "setting-up" the receiver, as an aid in making gray scale adjustments during television manufacture and service. Such open-circuiting of the cathode has been found superior to the grounding of the grid of the vertical output tube, in this respect, in that less likelihood exists for picking-up significant horizontal voltage pulses along the 24 inches or so length that exists between the service switch on the receiver chassis and the vertical output tube. With a grid circuit having an impedance with respect to ground of the order of several hundred kilohms, it has been observed that the presence of these horizontal pulses in the vertical circuit will degrade the receiver's interlace performance. With the lead connecting from the service switch to the low impedance cathode circuit of the vertical output tube, on the other hand, any pick up of horizontal signal becomes insignificant and interlace performance remains substantially unaffected as a result.

BRIEF DESCRIPTION OF THE DRAWING

These and other features of the invention will become clearer from a consideration of the following discussion taken in connection with the accompanying drawing which shows in schematic form a video amplifier circuit and a vertical deflection circuit in conjunction with which the voltage dependent resistance control arrangement of the Ser. No. 158,451 application and the service-switch construction of the present invention are particularly attractive.

DETAILED DESCRIPTION OF THE DRAWING

In the drawing, video signals having both alternating and direct current components are supplied from a video amplifier terminal 10 through a delay line 12 and a normally conducting blanking diode 14 to a junction point 16. A peaking coil 18 and a resistor 20 serially couple the junction of the components 12, 14 to ground, with the delay line 12 providing the required delay for the luminance signals and with the resistor 20 providing a terminating impedance for the line and a load impedance for the video amplifier. The alternating current components of the video signal are coupled from junction point 16 to the control grid of a pentode video output tube 22 via a capacitor 24 and a resistor 26. The direct current components of the video signal are coupled around the capacitor 24 by a decoupling resistor 28, a brightness control potentiometer 30 and another decoupling resistor 32.

The video output tube 22 has a contrast control circuit 34 connected to its cathode circuit, including a control potentiometer 36 and a resistor 37 coupling the variable arm of the potentiometer to ground. An output load circuit for the anode of the tube 22 is comprised of a load resistor 38 and a peaking coil 40 serially connected to a source of positive potential B+. The video signals which are developed across the resistor 38 and coil 40 may be direct current coupled to appropriate cathode electrodes of an image reproducing kinescope (not shown) by means of a lead 44.

Where the brightness control potentiometer 30 is to be mounted at a point on the cabinet of the receiver where it will be readily available to the viewer, its connection to the circuit may be made by way of leads 46, 48, respectively connecting one terminal of the resistive element of the potentiometer to the resistor 28 and the variable tap of the potentiometer to the resistor 32. Capacitors 46′, 48′ respectively represent the distributed capacitance to ground of the leads 46, 48, and, also any capacitance to ground which is inherent in the potentiometer 30 itself. Because the capacitance represented by these dotted capacitors 46′ and 48′ may be sufficiently large to provide a reactance for the video signal frequencies which is low with respect to the termination impedance 18, 20, the video signal might be severely attenuated if the decoupling resistor 28 is not used. The capacitance represented by capacitors 46′, 48′ also presents a low impedance with respect to the input impedance at the control grid of the output tube 22 so that the video signal might be significantly attenuated if the decoupling resistor 32 were not used.

The blanking diode 14 is maintained in a conducting condition during the line scanning intervals of a television waveform by the connection of a resistor 50 between the junction point 16 and a source of positive potential $+V_1$. In order to prevent video signals from reaching the control grid of the output tube 22 during the line retrace intervals, negative blanking signals from a source terminal 52 are applied to the anode of the diode 14 by means of a capacitor 54 and a resistor 56. If the blanking were to be accomplished by some other means, the junction of the peaking coil 18 and the delay line 12 would be directly connected to the junction 16 but, in either case, that junction will generally be at some positive potential.

The variable tap of the brightness control 30 is shown as being connected via a lead 60 to a brightness limiter potentiometer 62, coupled in turn to a source of negative direct voltage $-V_2$ at a terminal 64 by a resistor 66. With the brightness control 30 set for minimum resistance and with the contrast control 36 set at mid-range, the brightness limiter potentiometer 62 is adjusted until the positive direct voltage developed at the control grid of video output tube 22 by the divider action of resistors 28, 30, 62, 66 between the signal level input at the anode of the blanking diode 14 and the $-V_2$ terminal 64 is sufficient to cause a predetermined direct current flow (e.g., 240 milliamperes) to be measured in the cathode circuit of the receiver's horizontal output tube, for example. After this setting of the potentiometer 62, further adjustment of the brightness control 30 will not cause such increase in the control grid voltage of video output tube 22 as will result in an unstable brightness condition.

The vertical deflection circuit in conjunction with which the present invention is operative includes a vertical oscillator stage 70 and a vertical output stage 72. The output terminals Y—Y of vertical stage 72 are coupled to appropriate deflection windings on the image reproducing kinescope in any appropriate manner.

As illustrated, the vertical oscillator stage 70 and vertical output stage 72 may be constructed by utilizing the two sections of a double triode, such as RCA Type 13GF7. As is customary in circuits of this type, the oscillator section 70 produces a substantially sawtooth voltage waveform which is coupled by means of a capacitor 74 and a resistor 76 to the control grid of the output section 72. Oscillations are maintained in the circuit by a positive feedback from the anode of section 72 to the control grid of oscillator 70 via a pulse shaping network comprising capacitor 78, resistors 80, 82 and 84, capacitors 86, 88 and 90, and resistors 92 and 94. Resistor 94 is shown variable, to serve as a vertical "hold" control which is adjustable to permit the setting of the frequency of oscillation at a desired value.

After initial adjustment of resistor 94, the frequency of oscillation is maintained by means of vertical synchronizing pulses supplied at a terminal 96 and coupled to the control grid of output section 72 via capacitors 98 and 74 and resistor 76. The amplitude of the sawtooth drive voltage supplied by oscillator section 70 may be adjusted by means of a variable resistor 100 having an adjustable tap serially coupled by a resistor 102 to the anode of oscillator 70, with the drive voltage being further dependent upon the anode supply voltage provided through the control 100 from a "B boost" terminal 104 of the receiver's horizontal deflection circuit by means of a resistor 106. The shape of the sawtooth drive waveform supplied by the oscillator 70 is dependent upon the values chosen for capacitor 98 and resistor 108, together with the values of resistors 100, 102 and 106.

As will readily be appreciated, the shape and amplitude of the anode current produced in output section 72 are dependent upon the shape and amplitude of the sawtooth drive voltage supplied by oscillator section 70 (controllable as explained above) and, furthermore, are dependent upon the operating conditions and characteristics of the particular discharge device utilized in output section 72. The operating conditions (i.e., control grid-to-cathode bias) may be adjusted by means of a variable height control resistor 110 coupled in series with a fixed resistor 112 in the control grid circuit of output section 72, the cathode circuit including a resistor 114 being returned to ground by means of a service switch 115 coupled at the back of the receiver chassis by means of leads 117, 119. The operating conditions of section 72 will be seen to be further dependent upon the magnitude of a negative grid control voltage $-V_3$ provided at the terminal 116 coupled to the resistor 110. As will be seen, resistor 114 is included in the cathode circuit of section 72 when the switch 115 is in its "NORMAL" position, but is removed from the circuit, thereby opening the cathode when the switch is in its "SERVICE" position.

The anode of output section 72 is coupled to a positive voltage supply (+280v.) by means of a primary winding **150*a* of an output transformer 150. The anode current variations which are produced in output section 72 as a result of the sawtooth drive voltage applied to the control grid thereof flow through the primary winding 150a to produce in secondary winding 150*b*** the required sawtooth deflection current waveform for application to the vertical deflection winding on the kinescope via the terminals Y—Y.

The negative direct voltage provided at the $-V_2$ terminal 64 for the brightness control circuit and at the $-V_3$ terminal 116 for the vertical height control circuit are derived from a compensating circuit indicated generally by the reference numeral 120, which is responsive to power line variations. As shown in the drawing, this compensating arrangement 120 includes a voltage dependent resistance 122 coupled in series with the ON/OFF switch of the television receiver 124 to sense the applied line voltage, and a fixed resistor 126 which couples the voltage dependent device to ground. A semiconductor rectifier 128 has its cathode coupled to the junction of resistors 122, 126 and its anode coupled to ground via a filter capacitor 130. A resistor 132 is coupled across the dependent device 122 to lessen the effect of the negative temperature coefficient exhibited by this component. As is also shown, the anode of rectifier 128 is coupled to the $-V_2$ voltage terminal 64 associated with the brightness control 30 and to the $-V_3$ voltage terminal 116 associated with the vertical height control 110.

In the operation of the circuit of the drawing as so far described, the compensating circuit 120 provides a negative direct voltage at the junction of rectifier 128 and capacitor 130. This voltage varies in accordance with changes in the power line voltage in a manner to become more negative as the line voltage increases from a nominal 120 volt value and to become less negative as the applied line voltage decreases in value. Increases in line voltage which tend to increase the positive excursion of the input signal at diode 14—thus tending to increase the conduction of the video output tube 22, thereby reducing the direct voltage component of the signal applied to the cathode electrode of the picture tube kinescope and increasing reproduced brightness—, however, will be offset by the increasing negative direct voltage applied as the compensating $-V_2$ bias to the brightness limiter potentiometer 62 by way of resistor 66 and the terminal 64 connected to the junction of rectifier 128 and capacitor 130. Similarly, decreases in line voltage which tend to decrease the positive excursion of the input signal—thereby decreasing the video output tube conduction and the resulting reproduced brightness—are likewise offset by the less negative compensating $-V_2$ bias voltage applied to the brightness limiter 62 through its associated terminal 64 and resistor 66.

In corresponding manner, variations in the power line voltage serve to vary the "B boost" voltage provided as the anode supply for the oscillator section 70 by means of resistors 106, 100, and 102 serially coupled in that order. The variations in the amplitude of the sawtooth drive voltage supplied as a result are compensatingly offset, however, by the varying bias applied to the control grid of the output section 72 by virtue of the changing negative direct voltage coupled to the height control terminal 116 from rectifier 128 and capacitor 130, as coupled to it through resistors 112 and 76. Here, also, any line voltage change in a direction to change the "B boost" voltage to increase or decrease drive amplitude (and, consequently, the vertical height of a reproduced picture) is offset by virtue of the increasing or decreasing negative direct voltage applied to the control grid of the output section 72 by virtue of the coupling from the compensating circuit 120 to the terminal 116. It will be apparent that the changing negative voltage coupled to the grid of section 72 similarly offsets the tendency for the vertical height to vary in response to increases or decreases in the +280 volt B+ voltage applied to the anode of output section 72.

In actual practice, it has been observed that a substantially constant brightness and vertical height characteristic is maintained in the reproduced image when the change of negative direct voltage applied to the brightness control circuit and to the vertical height control circuit varies in greater proportion than the variations in line voltage which initiate such change. For that reason, a voltage dependent device—such as the VDR 122—is employed in the coupling circuit for the applied line voltage, rather than a fixed resistor. With a device having a negative voltage coefficient, the resistive voltage divider formed by the dependent device 122 and the fixed resistor 126 serves to produce a negative direct voltage at the junction of rectifier 128 and capacitor 130 which changes proportionally greater than the line voltage variation.

Gray scale adjustments may be made during television manufacture and service by moving the switch 115 from its "NORMAL" to its "SERVICE" position. This has the effect of open-circuiting lead 117 and removing the cathode resistor 114 from the vertical output section 72, thereby disabling the vertical deflection of the receiver. By employing a double-pole, double-throw switch as the device 115, as shown, this positioning to "SERVICE" to connect switch terminals 4 and 6 simultaneously connects its terminals 3 and 5. Such additional connection effectively open circuits lead 127 to remove the contrast control potentiometer 36 and the resistor 37 from the cathode circuit of the video output tube 22 and connects them, via leads 123, 125, as part of a divider network along with a further resistor 121 connected to the anode of tube 22 to develop a direct bias voltage for the kinescope cathodes. With fixed direct voltages applied to the control grids of the kinescope at this time—by a blanking stage, for example—adjustments of the screen grid voltages can be made via externally accessible controls to establish equal cut-off characteristics for the tri-color kinescope guns in setting up the grey scale. Moving the switch 115 back to the "NORMAL" position re-connects terminals 1 and 3 and terminals 2 and 4 to reinsert the resistor 114 in output section 72 and the contrast control 36 and resistor 37 in the direct current cathode circuit of the video output tube 22. In one embodiment of the invention, resistor 37 was selected small compared to the value of resistor 121 in establishing an electron gun bias of approximately 105 volts with a B+ source of 280 volts.

Any tendency for the receiver circuitry to pick up horizontal voltage pulses on the leads 117 and 119 coupling the switch 115 to the vertical output section 72 will be seen to be substantially reduced by coupling such pulses into the relatively low impedance of the cathode circuit of section 72. Coupling switch 115 to the high impedance grid circuit of section 72, on the other hand—as where the service switch function operates to ground that electrode to disable the vertical deflection—will be seen to present the possibility that any pulses so induced on the leads 117, 119 could upset the normal operation of the vertical oscillator and cause serious interlace problems in the operation of the receiver. As will be readily apparent, this switch coupling to open circuit the cathode to defeat the vertical deflection of output section 72 will thus enhance the interlace operation as compared to its disabling action when grounding its grid.

While there has been described what is considered to be a preferred embodiment of the present invention, it will be appreciated by those skilled in the art that other manners of open circuiting the cathode electrode of the output section 72 may be employed, without departing from the spirit and scope of the teachings herein. It is therefore submitted that any reading of the specification of this application take such teachings into consideration.

What is claimed is:

1. In a television receiver having a cathode-ray picture tube and deflection means for providing horizontal and vertical scanning waveforms to develop a reproduced image and being of the type including a vertical output tube having a grid electrode responsive to applied oscillation signals recurring at a field scanning rate, an anode electrode for providing output signals of said vertical scanning waveform and a cathode electrode, the combination therewith of:

a load impedance for said cathode electrode; and switch means coupled to said impedance and having a first position connecting said load impedance in circuit with said cathode electrode and a second position disconnecting said impedance from said cathode electrode, said switch means being moved to its said first position for enabling development of said vertical scanning waveform during normal operation of said television receiver in reproducing said image on the screen of said tube and being moved to its said second position for disabling development of said vertical scanning waveform during service of said television receiver in making gray scale adjustments on the screen of said picture tube.

2. The combination of claim 1 wherein said switch means comprises a switch physically located on the chasses of said television receiver and coupled to said load impedance by lead connections of the order of 24 inches and more in length capable of undesirably picking up spurious horizontal scanning waveform signals in coupling to said load impedance.

3. The combination of claim 2 in a television receiver also including a video output tube having a grid electrode responsive to applied picture representative input signals, an anode electrode for providing information signals to develop said reproduced image and a cathode electrode, wherein there is also included resistive means coupled to said switch means for connection in circuit with the cathode electrode of said video output tube when said switch means is moved to its said first position during normal operation of said television receiver in reproducing said image on said picture tube and for connection as part of a voltage divider in circuit with the anode electrode of said output tube when said switch means is moved to its said second position during service of said television receiver in establishing electron gun cutoff characteristics for said picture tube in making said gray scale adjustments.

4. The combination of claim 2 wherein said load impedance comprises a fixed resistor and wherein said vertical output tube and said resistor are so selected that the impedance existent at the cathode electrode of said output tube to said spurious horizontal scanning waveform signals when said switch means is in its said first position is substantially less than the impedance then existent at the grid electrode of said tube when said switch means is in its said first position.

* * * * *